April 21, 1942.    F. LE MIEUX, JR    2,280,592
SOIL TESTING DEVICE
Filed Aug. 16, 1939    3 Sheets-Sheet 1

Inventor:
Frederic LeMieux, Jr.
By Cushman, Darby, & Cushman
Attorneys.

April 21, 1942.  F. LE MIEUX, JR  2,280,592
SOIL TESTING DEVICE
Filed Aug. 16, 1939   3 Sheets-Sheet 2
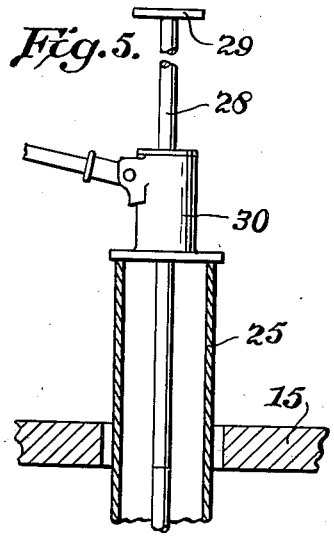
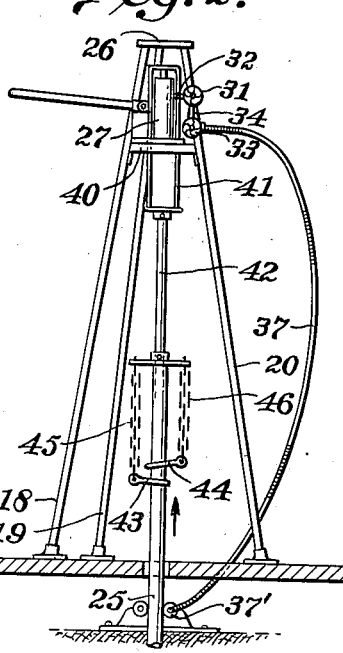
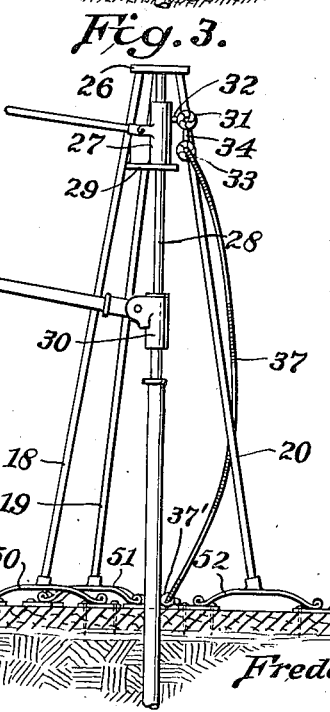
Inventor:
Frederic LeMieux, Jr.
By Cushman, Darby, & Cushman
Attorneys

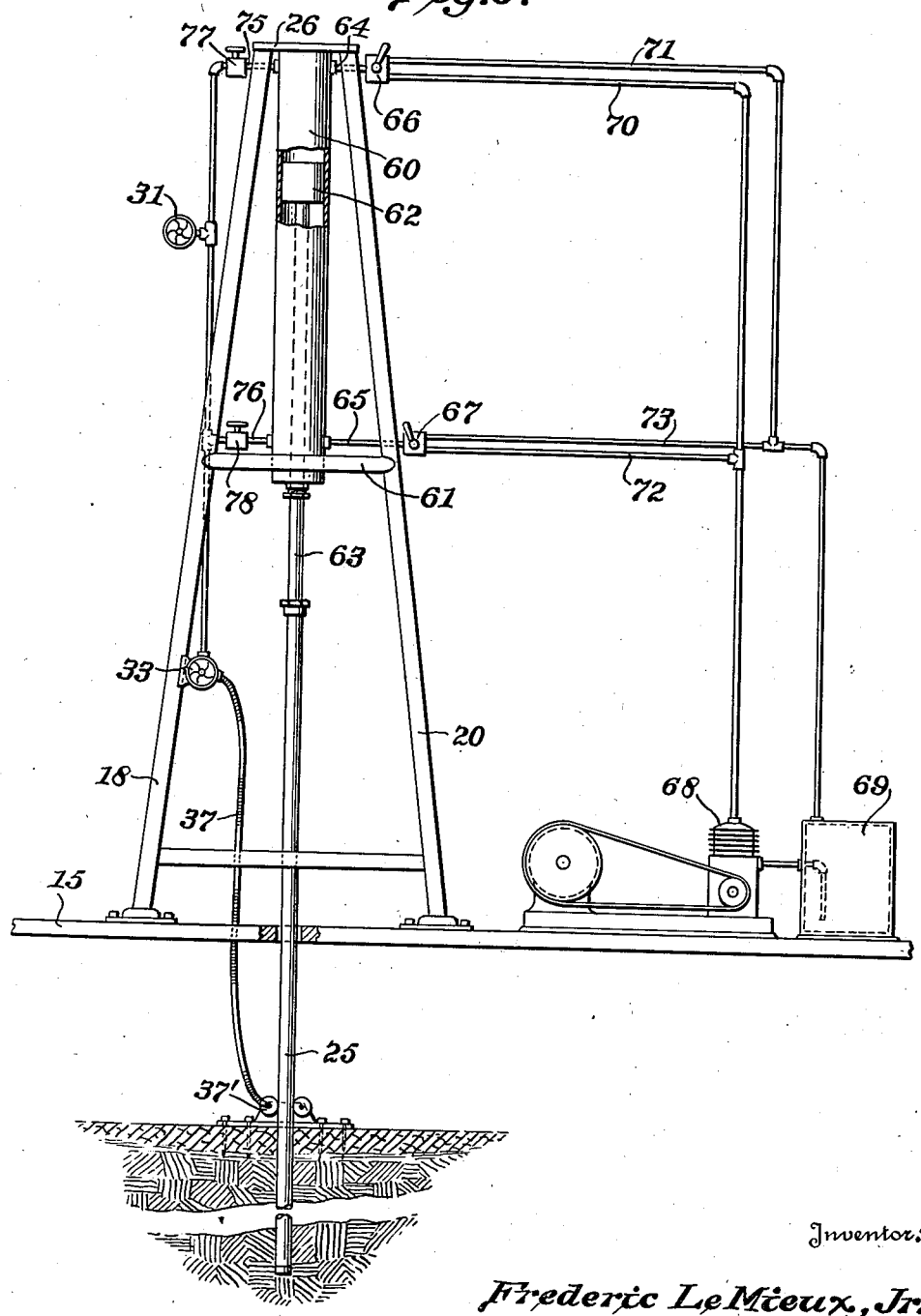

Patented Apr. 21, 1942

2,280,592

UNITED STATES PATENT OFFICE 2,280,592

SOIL TESTING DEVICE

Frederic Le Mieux, Jr., New Orleans, La.

Application August 16, 1939, Serial No. 290,475

4 Claims. (Cl. 265—14)

This invention relates to a soil testing apparatus and more particularly to a testing apparatus adapted to determine the load carrying characteristics of a pile. In the past, it has been possible to test the bearing capabilities of soil adapted to carry a footing foundation by a direction application of a unit load, however no adequate means have been available to test the different bearing capacities of a soil with relation to a pile foundation.

It has been proposed to drive a test rod into the earth with a hammer having a predetermined striking effort and then to measure the penetration resulting. The measurements thus obtained are used in an empirical formula to give certain data and while these results are useful, it has been found that they are not entirely accurate. Other methods also have been used in practice but none has been found to give dependable design information. The present invention is particularly designed to provide a means for driving a test rod in a manner to obtain accurate information for pile foundation design and it is the particular purpose of this invention to provide a device for indicating the actual load supporting ability of a test rod in a direct manner.

Another object is to provide a test rod loading means and gauges to indicate the load required to start movement of the rod and the load carried when movement ceases.

A further object is to make available means from which it is possible to determine the sustaining power of column piles.

Still another object is to provide a means to measure the friction coefficient between the test rod and any particular sub soil strata.

Another object is to provide means to determine the exact length of pile required to sustain a given load or the greatest load a certain length of pile will carry.

Numerous other objects are attained by the present invention and these will appear more fully below.

In the drawings:

Figure 2 is a detailed elevation of the invention shown in Figure 1 showing a means for withindrawing the test rod, Figure 3 shows another form of the invention, Figure 4 discloses a means for testing a particular sub soil strata.

Figures 1, 4:
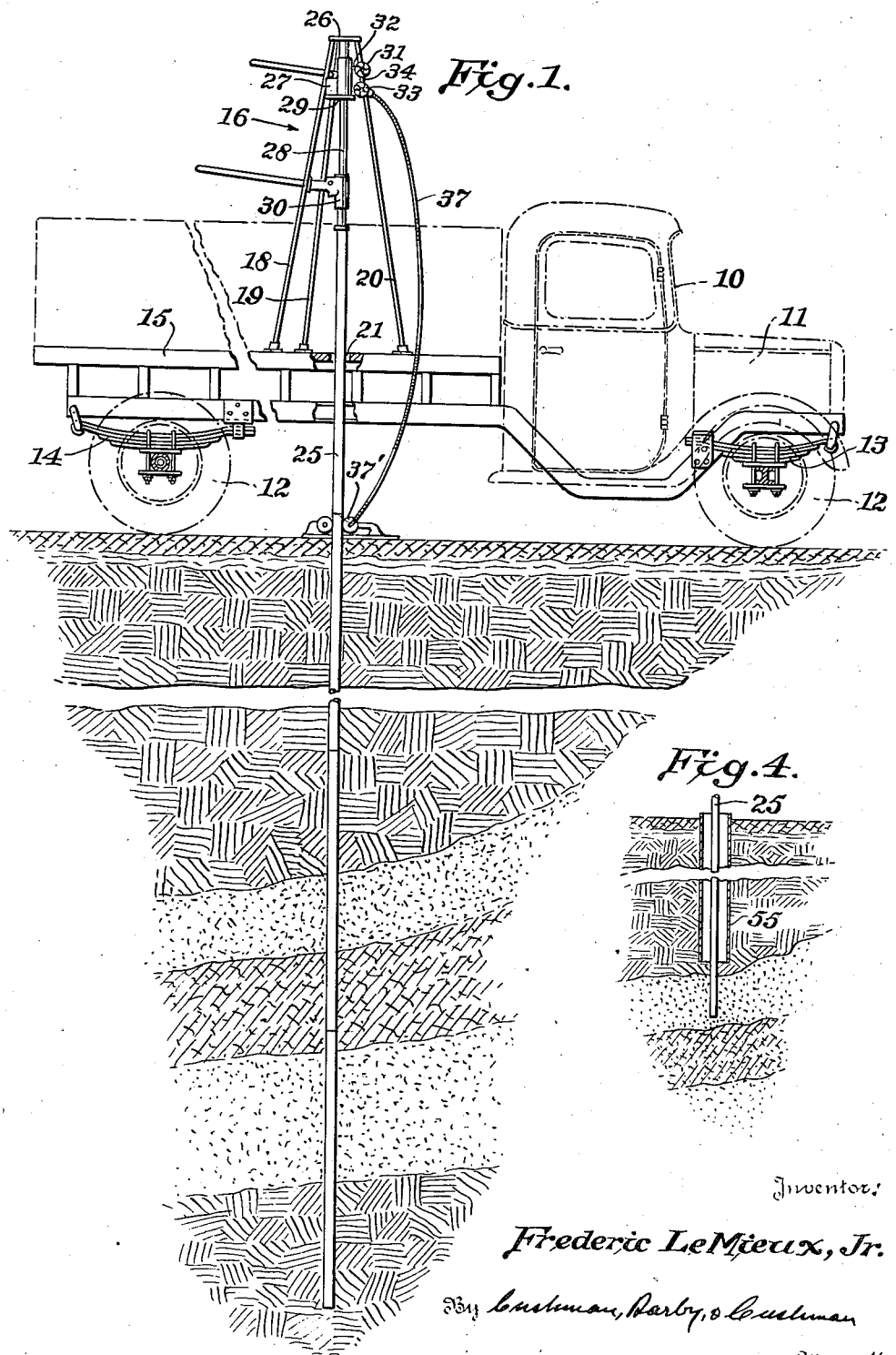
Figure 1 is a side elevation partly broken away of one embodiment of the invention.

Figure 5 is a detail view of the mechanical jacking means used in the forms of the invention shown in Figures 1 and 3, Figure 6 is a side elevation partly broken away of the preferred form of the invention, Figure 7 is a detailed section of the usual driving tip of the test rod, and Figure 8 is a detailed section of the head of the test rod for determining the plasticity of a certain substratum of soil.

In the embodiment of the apparatus shown in Figure 1, a platform truck is provided having a relatively heavy build. The truck has the usual cab 10, motor 11, wheels 12, and pairs of front and rear springs 13 and 14. The flat platform 15 has a frame structure or tripod 16 fixedly mounted adjacent the forward end of the platform in such a manner that it is disposed above the center of gravity of the truck structure for a reason that will appear below. The tripod includes legs 18, 19, and 20 and they are arranged around an aperture 21 in the platform and a test rod 25 is adapted to pass downwardly through the aperture to be driven into the earth without any interference from the usual drive mechanism and under structure of the truck. The upper end of the tripod legs are integrally connected to a plate 26 disposed above the aperture and it is seen that a rigid assembly is obtained including the truck chassis, the platform, and the tripod.

As above stated a test rod 25 is passed through aperture 21 and driven into the soil and suitable hand power means are positioned between the plate 26 and the test rod to force it downwardly. It is to be understood of course that any suitable power means could be used but in this modification of the invention, for the sake of simplicity, a hand operated hydraulic jacking means 27 which may be and preferably is a conventional automobile jack is positioned between plate 26 and the upper end of a jacking rod 28. The jacking rod, as shown in Figure 5, is provided on the upper end with a flat plate 29 which seats against the under side of the hydraulic jack as shown in Figure 1 and the jacking rod is adapted to extend downwardly therefrom through aperture 21 with its lower end reaching just below the floor of the platform 15 as shown in Figure 5. The test rod 25 being tubular in form, surrounds the downwardly extending jacking rod and a hand operated mechanical jack 30 cooperates with the jacking rod 28 to push thereagainst to force the test rod into the soil.

Referring to Figure 1, it is seen that a device is here provided wherein a rigid tripod is mounted on a platform truck so as to be portable. When it is desired to make a test sounding, the truck is propelled to the spot to be tested and a test rod is forced into the soil. After the desired length has been driven into the earth, the jacking means above described are manipulated to exert a direct loading effort on the test rod and, as it is thus loaded, an upward reaction is established against the plate 26 which is transmitted by legs 18, 19, and 20 to the platform of the truck such that the rigid truck structure including the truck chassis, body, motor, etc., is lifted. (Hereinafter whenever the word chassis is used it is intended to mean the body, motor, etc., all of which are supported above the chassis.) As the chassis is thus raised, the weight of the truck is taken off the wheels and by reason of the front and rear springs 13 and 14 interposed between the chassis and wheels, the weight is slowly transferred to the test rod. This is evident from the fact that the springs normally tend to carry all of the weight of the truck and as the chassis is slowly lifted the compression of the springs is relieved so that the weight is gradually applied to the test rod.

The springs 13 and 14 have another important function in this testing device in addition to the permitting of a gradual transfer of the load. In going from the condition where all of the weight of the truck chassis is carried by the springs, to the stage where all this weight is transferred to the rod, the chassis must be lifted a considerable distance and when the load is transferred back to the springs the chassis will descend slowly the same distance. This relatively long stretch of the spring or length of up and down movement of the chassis during variation of loading is taken advantage of to obtain very accurate measurements of the load capacity and reactions of the rod.

The hydraulic jacking means 27 has a pressure indicating device 31 operatively associated therewith which may be of the Bourdon type, the gauge 31 being connected by a fluid line 32 to the working chamber of the hydraulic pump. In the preferred construction, the gauge 31 is a recording gauge having a moving chart driven by a timing mechanism. A second Bourdon type pressure recording gauge 33 which preferably is fixedly mounted with respect to the hydraulic pump is also connected to the working chamber by a fluid line 34. The last named gauge has a flexible rotating link 37 connected between it and the friction wheel 37' which is rigidly mounted with respect to the surface of the earth and cooperates with the test rod in such a manner that the moving chart is controlled by its penetration into the soil and therefore the gauge is adapted to record the pressure in the working chamber of the hydraulic jack against the penetration of the test rod. In other words, the rotatable link 37 driven by the friction wheel 37' is connected to the recording drum of the gauge and as the rod sinks into the earth or is withdrawn therefrom as described below, the friction wheel 37' driving the drum through the flexible link 37 causes the recording drum to turn in exact relation so that the penetration and at the same time the pressure of the hydraulic fluid within the working chamber is constantly recorded. It is evident that the pressure indication can be calibrated to read directly in pounds load on the rod in order to obtain an immediate knowledge of its load capacity and reaction under specified conditions.

After the test rod has been driven and certain recordings made, it is sometimes desirable to measure the force necessary to withdraw it from the earth. One means to accomplish this is shown in Figure 2. In order to effect withdrawal, the mechanical jacking means 39 and jack rod 28 and the hydraulic jack are removed from the tripod. A fixed base plate 40 is mounted near the upper end of the tripod so that the hydraulic jack 27 may be supported thereon as shown. An extracting yoke frame 41 is adapted to be positioned over the upper end of the hydraulic jack so that it is lifted thereby as the jack is operated. The lower end of the extracting yoke is fixedly connected to the extracting rod 42 which in turn is removably connected to the test rod through grab-links 43 and 44. The grab-links are supported for lifting action from the extracting rod by chains 45 and 46. In this use of the hydraulic jack the two pressure gauges are again connected to the working chamber as above described and the flexible link 37 of gauge 33 is again connected to the test rod through the friction wheel 37' to turn the recording drum in proportion to the length withdrawn as above explained.

In the use of this structure, as the hydraulic jack is operated, the extracting yoke is lifted carrying the extracting rod 42 with it. The extracting rod is operative through chains 45, 46, and the grab-links 43 and 44 to exert an upward pull on the test rod to withdraw it from the earth. The flexible link 37 being operatively connected to the rod as it is lifted, actuates the penetration recording gauge as above described. It will be appreciated that as the extracting means is operated that the upwardly directed force required to lift the rod will create a downward reaction against plate 40 on the tripod which will be transmitted through the tripod legs 18, 19, and 20 to the platform 15 of the truck. As this load is placed on the platform, the springs 13 and 14 accomplish their full function. In this operation the springs are further compressed so that a gradual application of lifting force is applied to the test rod in the same manner as when it is loaded for inserting it in the soil and also, during the withdrawal, a relatively long movement is produced in platform 15.

The manner of using this apparatus is evident from the description of the structure itself. The truck is situated with aperture 21 over a specific location to be tested and the test rod is driven into the earth, readings being taken or not as desired. When a suitable length of test rod has been sunk, test loads may be gradually applied. By means of the recording gauges an exact account of the loads and the reaction of the rod under load may be had. In this connection, by reason of the relatively long movement of the truck platform during the loading and unloading process due to the action of the springs, the loads are built up and diminished under such controlled circumstances that the rod may be slowly loaded and the load sustained for relatively long periods or the load may be increased until actual movement takes place. The device is therefore operative to record directly the exact sustaining ability of the test rod or the total load required to cause it to penetrate more deeply into the earth. After the rod starts to sink no further load is applied and thereafter the actual load decreases because the platform settles onto the truck springs and this slow diminution of the load is recorded as well as the depth of penetration occasioned by the load, it being thus possible to determine also the load supported by the rod when all movement stopped. The variation in load is accompanied by a corresponding movement of the platform and due to the gradual transfer of the load from the rod to the springs and vice versa, accurate recordings of the rod's reaction may be obtained.

The tripod may be mounted directly on the surface of the earth around the test rod, as shown in Figure 3. In this device, the tripod legs 18, 19, and 20 are integrally secured to spring feet 50, 51 and 52 respectively. The spring feet are provided at their extreme ends with suitable means for fixedly securing the springs to the earth and when so secured the device is operative as above described to obtain the necessary data from the test rod.

The preferred form of test rod driving means is shown in Figure 6. In this embodiment of the invention, the tripod including legs 18, 19, and 20 and the rigid top plate 26 are mounted on the platform 15 of a truck as previously described. A hydraulic chamber 60 is rigidly supported from the top plate of the tripod and extends downwardly through a centering spider 61 mounted between legs 18, 19, and 20. A piston 62 having a downwardly extending piston rod 63 is adapted to reciprocate in the cylinder 60, the lower end of the piston rod being operatively connected to the upper end of the test rod 25, so that as the piston is driven through the cylinder, the test rod is driven into or withdrawn from the earth. The hydraulic cylinder is connected at its upper and lower ends with the two-way manually operated valves 66 and 67 through pipes 64 and 65 respectively.

The pipes 64 and 65 are designed to supply a pressure fluid in one end and permit an exhaust of fluid contained in the other end and to effect this, each of the two-way valves is connected by a pipe line to a pump 68 and a reservoir 69. The two-way valve 66 has a pressure supply pipe 70 and a return line 71 connected between it and the pump and the reservoir and the valve 67 has a pressure line 72 and a return line 73 connected between it and the pump and reservoir respectively.

The hydraulic cylinder is also supplied with pipe connections 75 and 76 so that pressure recording gauges 31 and 33 may be connected thereto in order to obtain a permanent record of the load reaction of the test rod as explained above in connection with the device shown in Figure 1. The connection 75 has a valve 77 connected in line therewith and connection 76 has a valve 78 in line therewith, so that by proper operation of the valve the gauges 31 and 33 may be connected to the working or pressure side of the hydraulic cylinder, the low pressure side being entirely shut off from the pipe line leading to the gauges so that an accurate measurement of the working pressure is obtained. The gauge 31 is the time-pressure recording gauge described above and gauge 33 is the penetration-pressure recording gauge which is adapted to measure the actual movement of the test rod with respect to the ground by means of the flexible rotatable cable 37 and friction wheel 37' bearing against the test rod.

In the operation of this preferred form of the test rod driving means, the pump 68 is operated by any suitable means so that a relatively high pressure is established in the pressure delivery lines 70 and 72. Assuming that the valve 67 is turned to the position where the pressure line is closed and the return line is open and valve 67 is set, so that the pressure line is open and the return line is closed, pressure will be established on top of the piston 62 to force it downwardly, thus driving the test rod into the earth. As the piston moves downwardly, it will force the liquid which fills the cylinder below the piston through the return line 73 into the reservoir 69. When the valve 66 is set so that the return line is open and the pressure line is closed and valve 67 is set so that the pressure line is open and the return line is closed, the pressure will be established on the under side of the piston to drive it upwardly to withdraw the test rod from the earth. In this instance, all the fluid above the piston will be driven through return line 71 to the reservoir 69. It is obvious of course, that as the test rod is driven into or withdrawn from the earth, loading reactions are established exactly as in the device described in Figure 1, that is, the truck chassis will be lifted and the load gradually transferred to the test rod due to the spring action of the truck.

It is understood of course, that during the test rod driving operation the gauges 31 and 33 are connected to the working chamber of the hydraulic cylinder so that a direct indication of the actual load on the test rod may be had.

In the use of this soil testing equipment, it is sometimes desirable to measure the plasticity of certain substratum. To accomplish this, the test rod tip shown in Figure 8 is used. The test rod is driven into the soil to the desired stratum with a tip shown in Figure 7, which keeps the hollow test rod free of any debris which might tend to be compressed into it. The test rod is then withdrawn and the hollow tip of Figure 8 is driven onto its lower end and the test rod is reinserted in the soil and forced into a firm seat in the hole. After the rod has been left stationary for a sufficient period to let the soil seal around the sides of the rod, a specified vacuum is created within the hollow test rod by any suitable means. This may be accomplished by disconnecting the test rod driving means and connecting any well-known form of vacuum pump directly to the upper end of the hollow test rod. The vacuum is maintained for a predetermined length of time which causes a certain quantity of soil to be sucked into the hollow test rod. When the rod is withdrawn the quantity of soil drawn into the rod forms an index of the plasticity of the soil.

In certain circumstances, it is desirable to obtain the characteristics of a particular strata of earth below the surface and to accomplish this an arrangement such as shown in Figure 4 may be provided. In this use of the testing equipment, a casing 55 is driven into the earth down to the upper surface of the strata to be tested. The earth within the casing is then removed and a test rod inserted and driven through the particular strata by the present testing means so that the necessary information may be obtained.

It will be apparent that the test rod may be driven into the bottom of the body of water by mounting the particular driving means here shown on any suitable barge. When the test rod is loaded, the barge will tend to lift out of the water, thus gradually shifting its weight to the test rod. The weight of the barge, the depth it floats in the water etc. must all be properly designed so that the load will be gradually shifted and to provide a sufficient length of movement in order that the gauges may be used to afford an accurate indication of the pressures encountered under the test conditions.

The invention described above is capable of many modifications, therefore the specification is not to be considered as limiting the invention beyond the requirements of the prior art. The invention is particularly described in the following claims.

I claim:

1. A soil substrata testing device having an elongated testing means adapted to be driven into the soil, said means being of substantially uniform cross section with the dimensions of any section through said means being at least equal to the dimensions of the corresponding next lower section through said means, said means having its surface in engagement with the soil including all the strata tested, means to drive said testing means through the substrata in more than one direction, means to supply a controlled driving force for said driving means to maintain a positive control of the movement of said testing means in each direction, and means to measure the driving force as said testing means is moved in each direction whereby from a knowledge of said values an accurate prediction of the characteristics of said substrata can be made.

2. A soil substrata testing device having an elongated testing means adapted to be driven into the soil, said means being of substantially uniform cross section with the dimensions of any section through said means being at least equal to the dimensions of the corresponding next lower section through said means, said means having its surface in engagement with the soil including all the strata tested, means to drive said testing means through the substrata in either direction of the length of said elongated testing means, means to supply a controlled driving force for said driving means to maintain a positive control of the movement of said testing means in each direction, and means to measure the driving force as said testing means is moved in each direction whereby from a knowledge of said values an accurate prediction of the characteristics of said substrata can be made.

3. A soil substrata testing device having an elongated testing means adapted to be driven into the soil, said means being of substantially uniform cross-section with the dimensions of any section through said means being at least equal to the dimensions of the corresponding next lower section through said means, said means having its surface in engagement with the soil including all the strata tested, hydraulic means to drive said testing means to cause penetration of and to drive said testing means through the substrata in more than one direction, means to supply hydraulic fluid under controlled pressure to said driving means to maintain a positive control of the movement of said testing means in each direction, and means to measure the pressure of said driving fluid as said testing means is moved in each direction whereby from a knowledge of said values an accurate prediction of the characteristics of said substrata can be made.

4. A soil substrata testing device having an elongated testing means adapted to be driven into the soil, said means being of substantially uniform cross-section with the dimensions of any section through said means being at least equal to the dimensions of the corresponding next lower section through said means, said means having its surface in engagement with the soil including all the strata tested, hydraulic means to drive said testing means to cause penetration of and to drive said testing means through the substrata in either direction of the length of said elongated testing means, means to supply hydraulic fluid under controlled pressure to said driving means to maintain a positive control of the movement of said testing means in each direction, and means to measure the pressure of said driving fluid as said testing means is moved in each direction whereby from a knowledge of said values an accurate prediction of the characteristics of said substrata can be made.

FREDERIC LE MIEUX, Jr.